US009551402B2

(12) United States Patent
Jud et al.

(10) Patent No.: US 9,551,402 B2
(45) Date of Patent: *Jan. 24, 2017

(54) BELT TENSIONING DEVICE FOR BEING USED WITH A STARTER GENERATOR

(71) Applicant: Muhr und Bender KG, Attendorn (DE)

(72) Inventors: Joachim Jud, Daaden (DE); Manfred Jung, Westerburg (DE)

(73) Assignee: Muhr Und Bender KG, Attendorn (DE)

( * ) Notice: Subject to any disclaimer, the term of this patent is extended or adjusted under 35 U.S.C. 154(b) by 190 days.

This patent is subject to a terminal disclaimer.

(21) Appl. No.: 14/474,430

(22) Filed: Sep. 2, 2014

(65) Prior Publication Data
US 2015/0018148 A1 Jan. 15, 2015

Related U.S. Application Data

(63) Continuation of application No. 12/455,110, filed on May 28, 2009, now Pat. No. 8,821,328.

(30) Foreign Application Priority Data

May 28, 2008 (DE) .................. 10 2008 025 552

(51) Int. Cl.
F16H 7/12 (2006.01)
F16H 7/08 (2006.01)

(52) U.S. Cl.
CPC .............. F16H 7/12 (2013.01); F16H 7/1281 (2013.01); *F16H 2007/081* (2013.01);
(Continued)

(58) Field of Classification Search
CPC ... F16H 7/12; F16H 7/1281; F16H 2007/0874
See application file for complete search history.

(56) References Cited

U.S. PATENT DOCUMENTS 315,735 A * 4/1885 Colburn .................. 474/134
952,156 A * 3/1910 Trewhella ............. F16H 7/1281
474/131
(Continued)

FOREIGN PATENT DOCUMENTS

DE 10321801 A1 7/2004
DE 102005039719 A1 3/2007
EP 1420192 A2 5/2004

OTHER PUBLICATIONS

European Search Report, Application No. EP 09006897.4 dated Feb. 24, 2010.
(Continued)

Primary Examiner — Minh Truong
(74) Attorney, Agent, or Firm — MacMillan, Sobanski & Todd, LLC

(57) ABSTRACT

A belt tensioning device for a belt drive which comprises a driving machine with a driving belt pulley drivable by a driveshaft around a driving axis, and a plurality of further belt pulleys and with an infinite belt which is wrapped around the driving belt pulley and the further belt pulleys wherein the belt tensioning device comprises a housing in which two tensioning arms are supported so as to be pivotable around a common pivot axis, in which tensioning arms there are supported tensioning rollers with axes of rotation extending parallel to the driving axis, wherein the tensioning arms are supported relative to one another by spring means, wherein, with the driving belt pulley mounted at the driving machine, the housing can be mounted in that, in an annular region surrounding the driveshaft of the driving belt pulley, the housing is contact-free relative to the driving machine.

20 Claims, 10 Drawing Sheets

(52) U.S. Cl.
CPC .............. *F16H 2007/0806* (2013.01); *F16H 2007/0874* (2013.01); *Y10T 29/49826* (2015.01)

(56) References Cited

U.S. PATENT DOCUMENTS

| | | | |
|---|---|---|---|
| 976,115 A | 11/1910 | Bard | |
| 1,433,958 A * | 10/1922 | Laughton | F16H 7/1281 474/132 |
| 2,766,417 A | 10/1956 | Merritt | |
| 4,034,821 A | 7/1977 | Stoddard et al. | |
| 4,112,767 A * | 9/1978 | Bochan | F16H 9/04 474/75 |
| 4,141,245 A * | 2/1979 | Brandstetter | G01L 3/247 474/109 |
| 4,299,582 A * | 11/1981 | Leitner | B62K 25/283 180/227 |
| 4,564,098 A | 1/1986 | Hormann | |
| 4,758,208 A | 7/1988 | Bartos et al. | |
| 4,934,989 A | 6/1990 | Furukawa et al. | |
| 5,443,424 A | 8/1995 | Henderson | |
| 5,449,328 A | 9/1995 | Schmidt et al. | |
| 6,648,783 B1 | 11/2003 | Bogner | |
| 6,689,001 B2 | 2/2004 | Oliver et al. | |
| 6,830,524 B2 | 12/2004 | Tamai | |
| 7,367,908 B2 | 5/2008 | Lemberger et al. | |
| 7,901,310 B2 | 3/2011 | Lolli et al. | |
| 9,133,762 B2 * | 9/2015 | Maguire | F02B 67/06 |
| 2005/0181901 A1 | 8/2005 | Shin et al. | |
| 2007/0037648 A1 | 2/2007 | Di Giacomo et al. | |
| 2008/0070730 A1 | 3/2008 | Nelson et al. | |
| 2014/0315673 A1* | 10/2014 | Zacker | F16H 7/1218 474/135 |

OTHER PUBLICATIONS

German Search Report, Application No. DE 102008025552.1-12 dated Nov. 6, 2008.
German Office Action, Application No. 102008025552.1 dated Jan. 29, 2015.

* cited by examiner

BELT TENSIONING DEVICE FOR BEING USED WITH A STARTER GENERATOR

CROSS-REFERENCE TO RELATED APPLICATIONS

This application is a continuation patent application of U.S. patent application Ser. No. 12/455,110, filed May 28, 2009, the disclosure of which is incorporated herein by reference.

BACKGROUND OF THE INVENTION

The invention relates to a belt tensioning device for a belt drive which comprises a driving machine with a driving belt pulley drivable by a driveshaft around a driving axis, and a plurality of further belt pulleys, and having an infinite belt which is wrapped around the driving belt pulley and the further belt pulleys, wherein the belt tensioning device comprises a housing in which two tensioning arms are supported so as to be pivotable around a common pivot axis, in which tensioning arms there are supported tensioning rollers with axes of rotation extending parallel to the driving axis, wherein the tensioning arms are supported relative to one another by spring means. Regardless of the terms used above, the tensioning device is intended to be suitable for chain and belt drives in general.

In a modern internal combustion engine comprising a starter generator, there occurs a change in the position of the tensioned strand and the loose strand, which position is found in the direction of rotation of the belt in front of the driving belt pulley on the one hand and in the direction of rotation of the belt behind the driving belt pulley on the other hand. Depending on the state of operation, torque can be released at the driving belt pulley during the starting process and consumed at the driving belt pulley during the driving process. In such a case, the loose strand should be loaded by a tensioning roller, and preferably two tensioning rollers are used directly in front of and directly behind the driving belt pulley. The change from torque release to torque consumption at the driving belt pulley corresponds to the change from torque consumption to torque release at the crankshaft belt pulley of the internal combustion engine.

EP 1 464 871 A1 proposes a double belt tensioning device wherein the pivot axis of the tensioning arms is positioned outside a polygon formed by the different axes of rotation of the belt pulleys. This has a number of disadvantages. Belt tightening devices of this type require a considerable amount of space which is not always available. The operation of positioning the belt is very complicated. Because of the long tensioning arms, long lever arms are provided which require high spring forces. Furthermore, the lever effect is very disadvantageous because, as a rule, the direction of the tensioning arm movement and the resulting direction of force of the belt deviate considerably from one another.

From DE 199 26 615 A1 there is known a tensioning device for traction means with two tensioning rollers wherein the axes of oscillation of the tensioning arms of the two tensioning rollers coincide with the driving axis of the driving belt pulley. The tensioning device comprises a flanged housing which supports a bearing shaft for a driving belt pulley. The device can be arranged at a driving machine in a finish-mounted condition, with the bearing shaft being connected to the driveshaft of the driving machine via a plug-in connection. Disadvantages of such a device include the driveshaft having two parts, with the bearing shaft of the driving belt pulley additionally having to be supported in the flange housing, as well as the design requiring a considerable increase in the overall length.

It is therefore an object of the present invention to provide a belt tensioning device of the latter type which has a simple design and, while having a short overall length, is provided with a design which facilitates mounting and removal.

SUMMARY OF THE INVENTION

Accordingly, a belt tensioning device for a belt drive is provided which comprises a driving machine with a driving belt pulley drivable by a driveshaft around a driving axis, and a plurality of further belt pulleys, and with an infinite belt which is wrapped around the driving belt pulley and the further belt pulleys. The belt tensioning device further comprises a housing in which two tensioning arms are supported so as to be pivotable around a common pivot axis. Tensioning rollers are provided, supported in the tensioning arms, and having axes of rotation extending parallel to the driving axis, wherein the tensioning arms are supported relative to one another by spring means. In addition, the driving belt pulley is mounted at the driving machine, and the housing can be mounted such that the housing can be contact-free relative to the driving machine in an annular region surrounding the driveshaft of the driving belt pulley.

This design results in an advantageous geometry for supporting the tensioning arms while preventing the occurrence of complications regarding the arrangement of the driving belt pulley and its support. More particularly, it is possible for the driving belt pulley to be arranged as closely as before to the driving machine. The operations of mounting and removing the belt tensioning device can advantageously take place independently of the mounting of the remaining parts of the belt drive. A belt tensioning device according to the invention can be arranged directly at a machine frame, and more particularly can be arranged at the internal combustion engine which also carries the driving machine, i.e. the starter generator and the further belt pulleys, with said arrangement including the use of an implement carrier between the belt tensioning device and the internal combustion engine. According to a further embodiment of the invention, according to which the basic design of the driving machine, i.e. of the starter generator and of the driving belt pulley, remains substantially unaffected, the belt tensioning device can be fixed to the driving machine, i.e. to the starter generator.

According to a further embodiment of the invention adapted according to the first mentioned type, a mounting arm can be provided which adjoins the housing circumference on the outside and which is positioned substantially in the plane of the housing. According to a further embodiment, a flange extension can be provided at the housing, which flange extension comprises bolting means to allow bolting to the driving machine, which bolting means can be positioned outside the diameter of the driving belt pulley. The flange extension can be positioned in the plane of the housing or it can be offset therefrom and point outwardly from the annular housing. The mounting means is preferably positioned in a circumferential region which is positioned substantially opposite the tensioning arms and the driving belt pointing away from the driving belt pulley. In an axial view of the driving belt pulley, the fixing means at the housing preferably extend over a partial circle or circular sector of 30° to 270°, more particularly 45° to 180°.

According to a preferred embodiment, the pivot axis of the tensioning arms is arranged inside the outer diameter of the driving belt pulley, and can be more particularly arranged coaxially relative to the driving axis of the driving belt pulley. In this way, it is possible to achieve a compact arrangement, permitting good axial mounting conditions for the housing including the tensioning arms, with the driving belt pulley being suitable for being mounted at the driving machine. In an axial view of the driving belt pulley, the mounting means for mounting the housing at the driving machine or to any other stationary component are preferably positioned outside the outer diameter of the driving belt pulley. This allows the housing to be easily mounted and removed, with the driving belt pulley being mounted at the driving machine.

Furthermore, at least three different embodiments of a belt tensioning assembly according to the invention are described herein.

According to a first embodiment, an assembly is provided wherein the housing is comprised of two plates between which two tensioning arms are held. Furthermore, the housing can be provided to form two axially spaced bearing races in which the tensioning arms are doubly supported, with the tensioning arms each forming two annular counter bearing rings which are supported in the bearing races of the housing. A first tensioning arm can be provided to be supported directly in the housing, and a second tensioning arm can be provided to be supported in the first tensioning arm, and sliding bushes can be provided arranged there-between, which sliding bushes can be provided consisting of a bearing material.

According to a second embodiment, an assembly can be provided wherein the housing is provided in the form of one plate with a circular aperture which forms a bearing race and which is embraced from the inside by the counter bearing races in both tensioning arms. In this case, too, a first tensioning arm can be provided to be supported directly in the housing and with a second tensioning arm provided to be supported in the first tensioning arm, and again sliding bushes can be provided comprising of a bearing material and which can be arranged in between. Preferably, the tensioning rollers are provided such that each are supported so as to be cantilevered in a cheek of each of the tensioning arms.

According to a third embodiment, an assembly is provided wherein the housing is provided in the form of a sleeve which forms a bearing race on which the two tensioning arms are supported by corresponding counter bearing races. In this case, too, a first tensioning arm can be provided to be supported directly on the housing, a second tensioning arm can be provided to be supported on the first tensioning arm, and sliding bushes can be provided comprising a bearing material arranged there-between. In this case, too, the tensioning rollers can be arranged at the tensioning arms so as to be cantilevered on one side.

Embodiments of the invention can include a belt drive which comprises a driving machine with a driving belt pulley drivable around a driving axis, and a plurality of further driving pulleys, and with an infinite belt which is wrapped around the driving belt pulley and the further belt pulleys, with a belt tensioning device comprising a housing in which two tensioning arms are supported so as to pivot around a common pivot axis. In each of the tensioning arms, tensioning rollers can be supported, whose axes of rotation extend parallel to the driving axes, wherein the tensioning arms are supported relative to one another by spring means, having a belt tensioning device with one or more of the above-mentioned characteristics.

The tensioning spring effective directly between the tensioning arms is preferably provided in the form of a pressure spring. Tensile springs, hairpin springs, torsion springs or other types of spring can also be provided. Particular preference is given to a bent flat spring or band spring extending over an angular range of less than 360°.

The tensioning rollers can be arranged at the shortest possible distance from the driving belt pulley. In this way, further space can be provided to accommodate further aggregates driven by the belt drive.

Preferred embodiments of the invention are illustrated in the drawings and will be described below.

DETAILED DESCRIPTION OF THE PREFERRED EMBODIMENT

Figure 1:
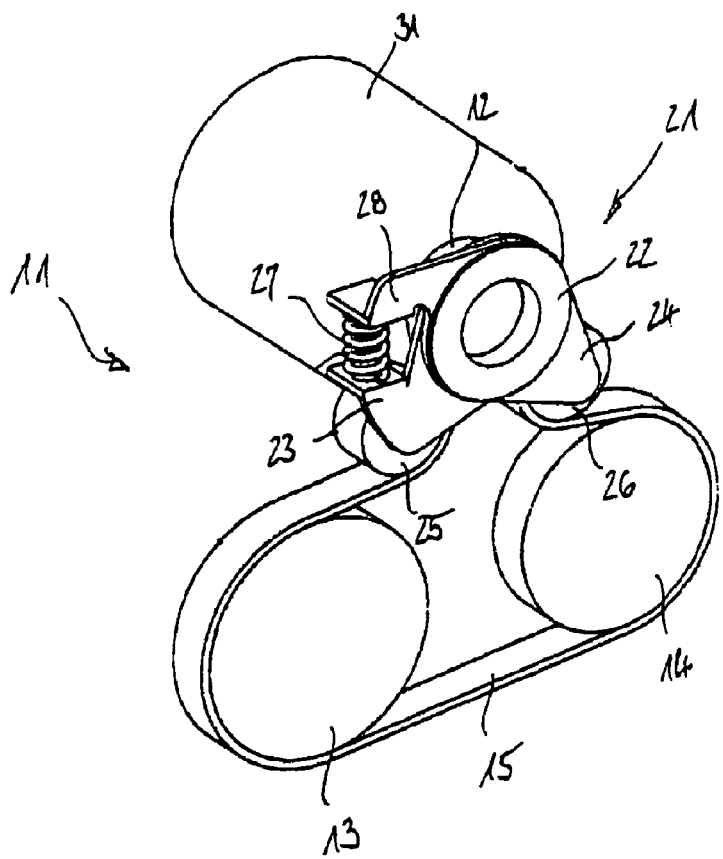
FIG. 1 shows a belt drive assembly according to the invention in a 3D illustration without the mounting means.

As shown in FIG. 1, a belt drive 11 according to the invention is provided which comprises a driving belt pulley 12 which, alternately is able to release torque or consume torque, as well as two further belt pulleys 13, 14 which are able to consume torque or release torque. The belt pulleys 12, 13, 14 are wrapped around by traction means in the form of an infinite belt 15 which can be provided in the form of a V-ripped belt (poly V-belt) or as a V-belt; the traction means can also be provided in the form of toothed belts or flat belts or link belts or chains. On both sides of the driving belt pulley 12, the belt 15 is acted upon by tensioning rollers 25, 26 which are supported in tensioning arms 23, 24 which form part of a belt tensioning device 21.

A belt tensioning device 21 according to the invention can comprise a housing 22 in which two tensioning arms 23, 24 are held with the tensioning rollers 25, 26. The tensioning arms 23, 24 are pivotable relative to one another around a common pivot axis, with the pivot axis being positioned inside the diameter of the driving belt pulley, preferably so as to extend approximately coaxially to the driving axis of the driving belt pulley 12. The tensioning arm 24 comprises a counter arm 28, and a tensioning spring 27 is provided in the form of a helical pressure spring which can be inserted between the tensioning arm 23 and the counter arm 28 of the tensioning arm 24. Forced by the tensioning spring 27, the tensioning rollers 25, 26 can act from the outside on the rear of the belt. The housing 22 can be provided in front of the plane of the belt 15 and of the belt pulleys 13, 14, and more particularly can be provided in front of the driving belt pulley 12. In this illustration, the driving belt pulley can be a belt pulley on the driveshaft of a driving machine, more particularly of a starter generator 31, and, accordingly, one of the belt pulleys 13 or 14 can be the belt pulley on the crankshaft of an internal combustion engine. The details of mounting the housing 22 at the driving machine 31 are not shown in this illustration. However, the housing 22 can be provided to be contact-free relative to the driving pulley 12, its rotating driving means and an annular region surrounding the exit of the rotating driving means out of the driving machine 31. When under the influence of the tensioning spring 27 built in a pretensioned condition, the tensioning arms 23, 24 can be provided to press the tensioning rollers 25, 26 from the outside against the belt 15, so that, independently of the operating condition, i.e. both when torque is consumed and released by the driving belt pulley 12, any looseness in the respective loose strand between the driving belt pulley 12 and the further belt pulley 13 can be prevented, and additionally any looseness between the driving belt pulley 12 and the further belt pulley 14, can be prevented while a tensile stress can be built up.

The entire belt tensioning device 21 can be designed and arranged so as to be contact-free relative to the driving belt pulley 12, to the rotating parts connected to the driving belt pulley 12, and more particularly to the driveshaft of the starter generator 31. The mounting means for the housing 22 can be attached outside the belt course at the starter generator 31 or at another machine part.

Figure 2:
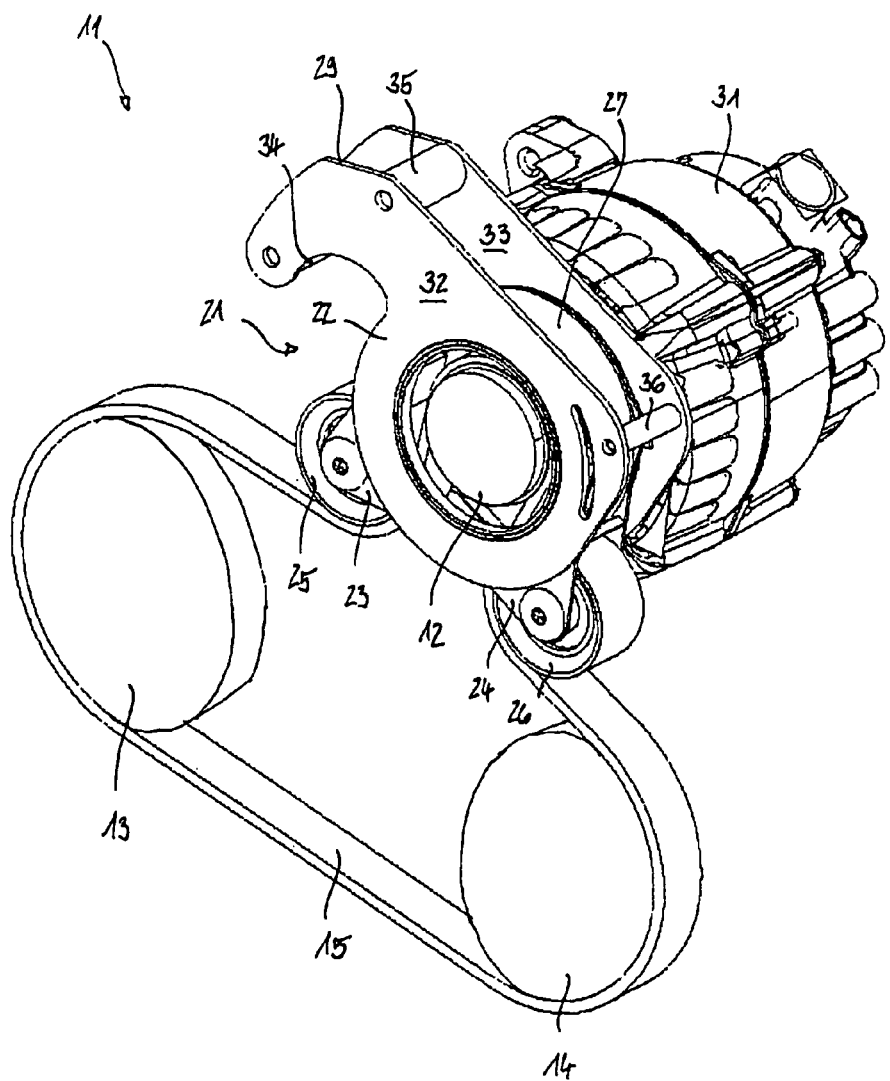
FIG. 2 shows an embodiment of a belt drive assembly according to the invention in a 3D illustration.

FIG. 2 shows a belt drive 11 according to the invention with a tensioning device 21 according to the invention, also showing details of the mounting means. Again, the driving belt pulley 12 is attached to a starter generator 31. In such an embodiment, the housing 22 of the belt tensioning device 21 comprises a mounting arm 29 for being attached to the same machine frame as the starter generator 31, either directly or by means of an implement carrier. In this embodiment, the driving belt pulley 12 can be positioned inside the housing 22 and can be attached independently of the mounting of the starter generator. The housing 22 can extend around the course taken by the belt 15 which exits between the tensioning rollers 23, 24 at the circumference from the housing 22. The housing 22 can comprise two plates 32, 33 which are positioned normally relative to the driving axis and which are connected to one another by bolts and spacing pieces 34, 35, 36. The plates 32, 33 can comprise central apertures, so that, with the driving belt pulley 12 being in the mounted condition, the housing 22, together with the belt 15, can be moved into position, such as illustrated, and fixed to such a position. Between the plates 32, 33, a tensioning spring 27 can be provided in the form of a flat stirrup spring and which can be supported on the two tensioning arms 23, 24. Furthermore, between the two plates 32, 33, at least in one circumferential region between the two tensioning arms 23, 24, a radial aperture can be formed to allow of the belt 15 to pass through.

Figure 3:
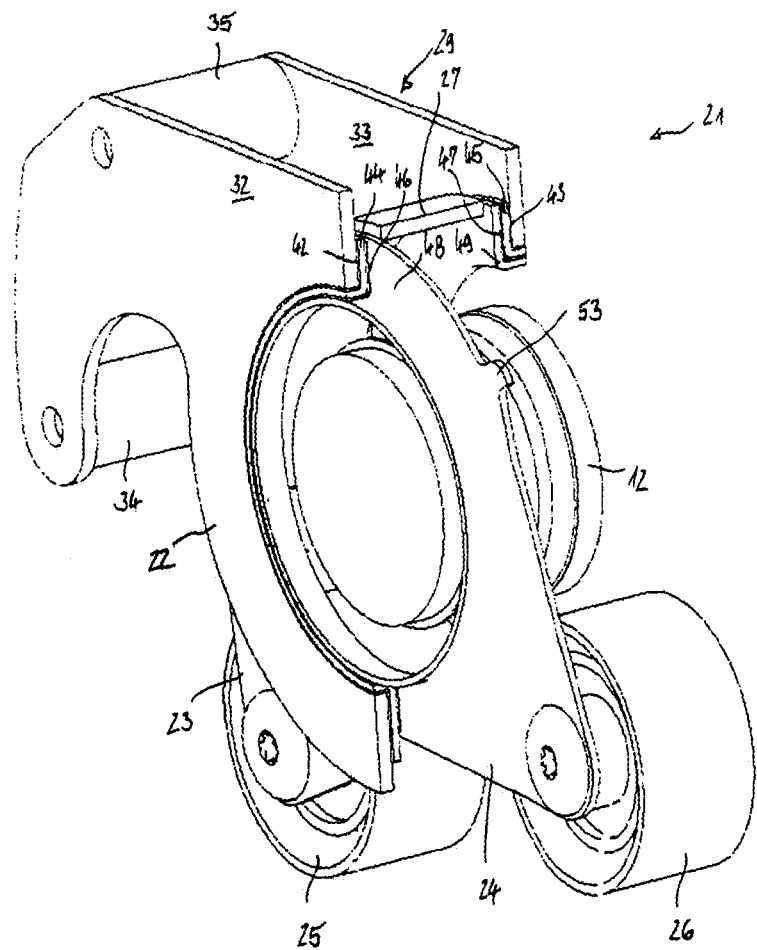
FIG. 3 shows a belt tensioning device of the belt drive according to FIG. 2 in a sectional 3D illustration.

In FIG. 3, any details identical to those shown in FIG. 2 have been given the same reference number. To that extent, reference is made to the description of FIG. 2. In FIG. 3, the tensioning device 21 according to FIG. 2 is shown as an assembly as associated with the driving belt pulley 12, with parts of the housing 22 being cut away. FIG. 3 shows the driving pulley 12 which is not connected to the starter generator and which can be embraced by the housing 22 in a contact-free way. From the housing 22, the mounting arm 29 is shown. In the region of the mounting arm 29, spacing pieces 34, 35 are arranged between the plates 32, 33. Two circular apertures in the plates 32, 33, can be provided to form two axially spaced stationary bearing races, into which a first pair of collar bushes 42, 43 can be inserted and in which the first tensioning arm 23 can be directly supported. The first tensioning arm 23 comprises two cheeks 44, 45 which can each be provided with circular apertures which can be embraced by formed-on collar projections. In the region of the collar bushes 42, 43, the first tensioning arm can be inserted with the collar projections into the circular holes in the plates 32, 33. The cheeks 44, 45 of the first tensioning arm 23 are connected to one another at least through the bearing journal of the tensioning roller 25. Into the collar projections of the cheeks 44, 45, second collar bushes 46, 47 can be inserted in which the second tensioning arm 24 is directly supported. The second tensioning arm 24 comprises two cheeks 48, 49 which can each be provided with circular holes which can be embraced by formed-on collar projections. A second tensioning arm 24 can be inserted into the region of the collar bushes 46, 47 and the collar projections can be inserted into the circular holes in the cheeks 44, 45 of the first tensioning arm 23. The cheeks 48, 49 of the second tensioning arm 24 are connected to one another at least via the bearing journal of the tensioning roller 26. At the cheek 48 of the tensioning arm 24 a supporting lug 53 can be formed and on which the flat stirrup spring 27 can be provided to support itself. Corresponding supporting means can also be provided at the second cheek 49 of the tensioning arm 24. At the supporting lugs, the stirrup spring 27 can be supported in a pre-tensioned condition. Corresponding double supporting means can be provided at the cheeks 44, 45 of the first tensioning arm 23. The tensioning rollers 25, 26 are preferably pressed apart against the returning force of the stirrup spring 27, with the procedure of mounting the belt tensioning device in the belt drive taking place with the tensioning rollers being in a pressed-apart condition.

Figure 4:
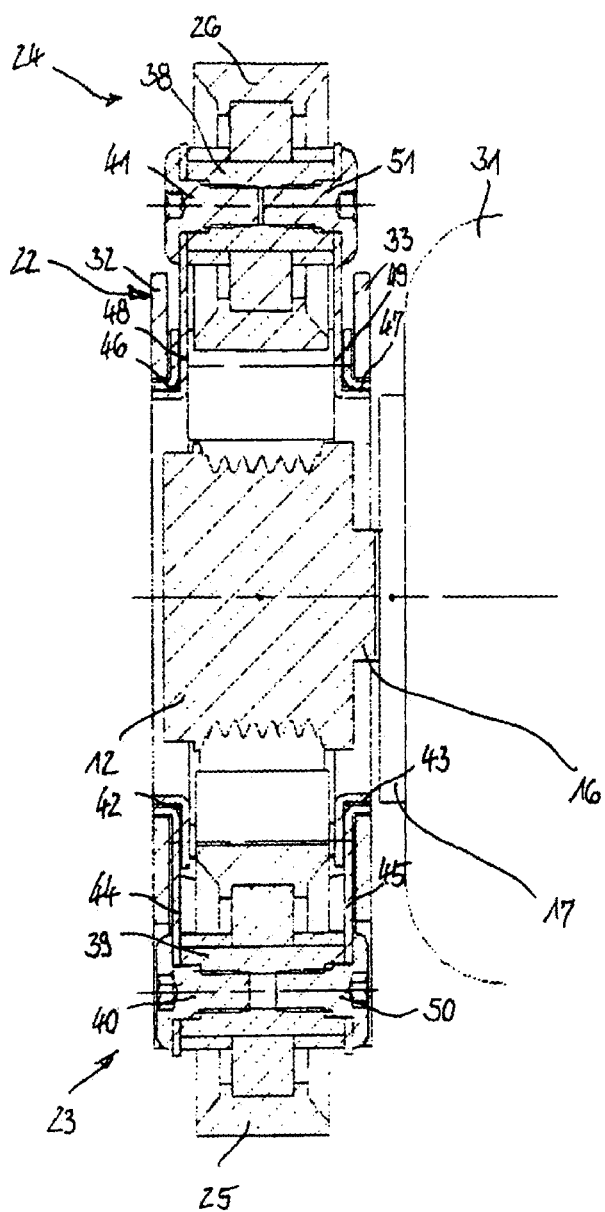
FIG. 4 shows a belt tensioning device according to FIG. 3 in an angled section through the axis of the driving belt pulley and through the axes of the tensioning rollers.

In FIG. 4, details identical to those shown in FIGS. 2 and 3 have been given the same reference numbers. As in FIG. 1, the arrangement of the belt tensioning device 21 is shown relative to the starter generator 31 and to the driving belt pulley 12. The housing 22 can be provided to be contact-free relative to the driving belt pulley and a stationary bearing means 17 of the driveshaft 16 in the starter generator 31. Between the two plates 32, 33 of the housing 22, the tensioning arms 23, 24 of the two tensioning rollers 25, 26, can be supported. The tensioning arm 23 of the tensioning roller 25 can be supported directly in the housing 22 and the tensioning arm 24 of the tensioning roller 26, in turn, can be supported in the tensioning arm 23 of the tensioning roller 25. Into the tensioning arms 23, 24 bearing journals 38, 39 can be inserted and which can be tightened by bolts 40, 41, 50, 51 in the respective tensioning arms 23, 24 as stationary axles. The tensioning rollers 25, 26 are supported thereon. It can be seen that the tensioning device 21, in its entirety, can be mounted at the starter generator by means of its mounting assembly without there being the need to remove the driving pulley 12. The same process can be provided for the removal of the tensioning device with the driving belt pulley being mounted at the starter generator.

Figure 5:
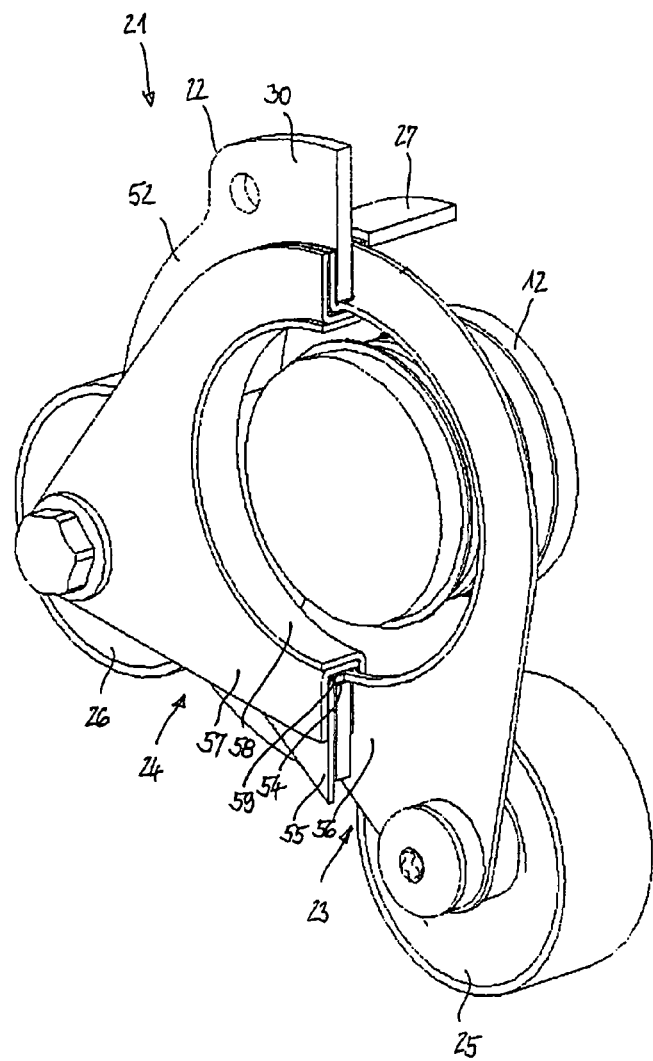
FIG. 5 shows a belt tensioning device in a second embodiment of an assembly according to the invention in a sectional 3D illustration.

FIG. 5 shows an embodiment of a belt tensioning device 21 according to the invention which largely corresponds to the embodiments according to FIGS. 1 to 4, to the description of which reference is hereby made. In the present embodiment, the housing 22 is provided in the form of a planar plate 52 with a circular aperture which is partly arranged in front of the plane of the driving belt pulley with a slight overlap. The mounting means for mounting the housing 22 are identifiable as a flange extension 30 with a fixing hole. Into the circular aperture of the housing 22, a first sliding bush 54 can be inserted. The circular aperture can be embraced by a first tensioning arm 23 comprising two cheeks 55, 56 and carrying a tensioning roller 25. The cheeks 55, 56 can each be provided with circular apertures which are enclosed by formed-on collar projections, and which are arranged to adjoin one another to form a U-profile. Into the circular aperture of the first tensioning arm 23, a second sliding bush 59 can be inserted into which there can be inserted a second tensioning arm 24 comprising two cheeks 57, 58 and which carries a tensioning roller 26. The cheeks 57, 58 are each provided with circular apertures which are edged by formed-on collar projections which are inserted into one another so as to form a U-profile. Into the circular hole of the first tensioning arm 23, a second sliding bush 59 can be inserted into which a second tensioning arm 24 can be inserted and which is comprised of two cheeks 57, 58 and which carries a tensioning roller 26. The tensioning rollers 25, 26 are floatingly arranged at the tensioning arms 23, 24. In this case, too, a tensioning spring 27 in the form of a flat band spring can be provided between the tensioning arms 23, 24, without details of supporting means being shown. The tensioning spring 27 can be pretensioned by pressing apart the tensioning rollers 25, 26, with the belt tensioning device with pressed-apart tensioning rollers 25, 26 being mounted in the pre-tensioned condition in the belt drive.

Figure 6:
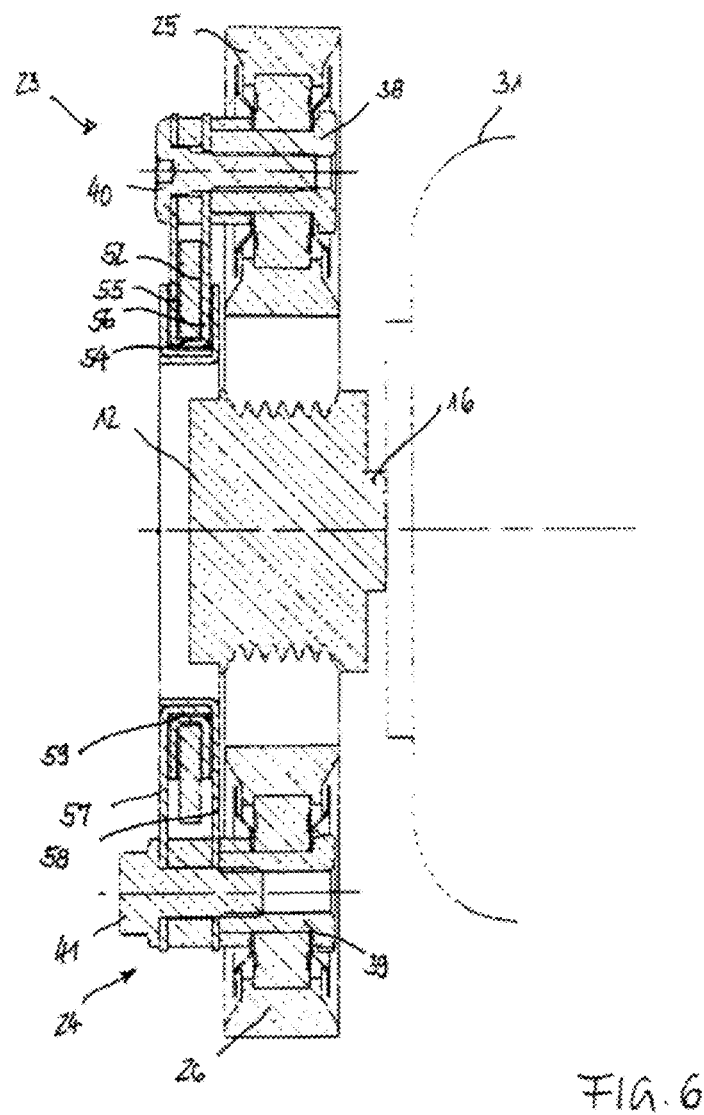
FIG. 6 shows a belt tensioning device according to FIG. 5 in an angled section through the axis of the driving belt pulley and through the axes of the tensioning rollers.

In FIG. 6, any details identical to those shown in FIG. 5 have been given the same reference numbers. As in FIG. 4, the arrangement of the belt tensioning device 21 is shown relative to the starter generator 31 and to the driving belt pulley 12. The housing 22 can be provided to be contact-free relative to the driving belt pulley and to the stationary bearing means 17 of the driveshaft 16 in the starter generator 31. In the plate-shaped housing 22, the tensioning arms 23, 24 of the two tensioning rollers 25, 26 can be supported. The tensioning arm 23 of the tensioning roller 25 can be supported directly in the housing 22, and the tensioning arm 24 of the tensioning roller 26 can be supported in the tensioning arm 23 of the tensioning roller 25. Bearing journals 38, 39 can be fixed by bolts 40, 41 at the respective tensioning arms as stationary axles are bolted to the tensioning arms. Tensioning rollers 25, 26 are rotatably supported thereon.

Figure 7:
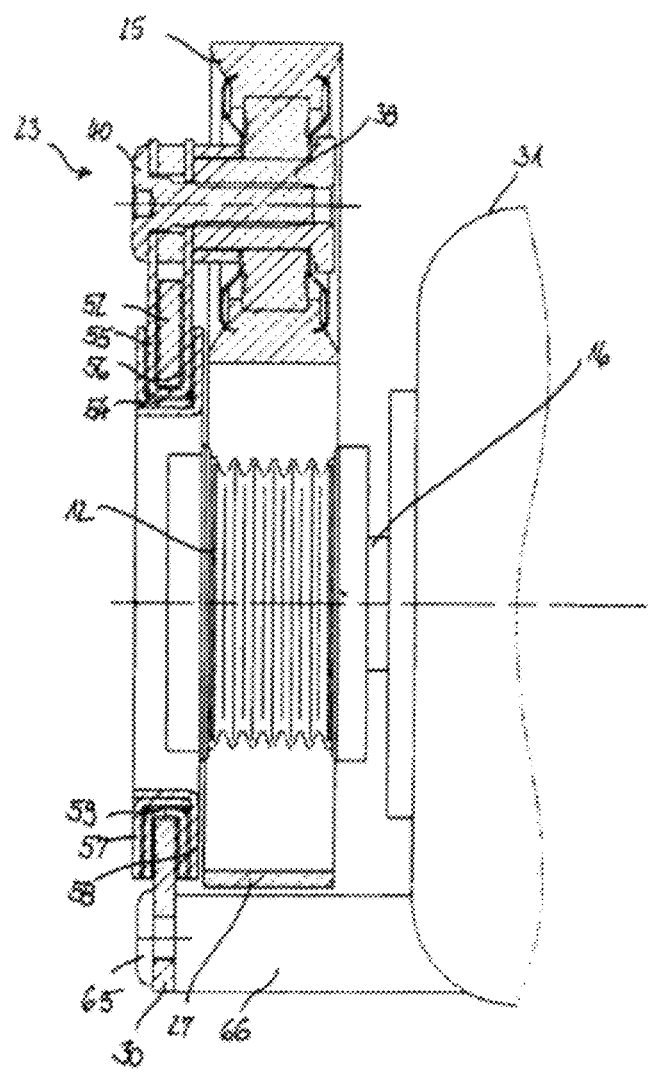
FIG. 7 shows a belt tensioning device according to FIG. 5 in an angled section through the axis of the driving belt pulley, the axis of a tensioning roller and the axis of a mounting bolt.

In FIG. 7, any details identical to those shown in FIGS. 5 and 6 have been given the same reference number. The illustrated angled section extends through the axis of the tensioning roller 25 as well as through a fixing journal 66. At least two, and preferably three, fixing journals 66 can be provided at the housing of the starter generator 31 to which the plate-shaped housing 22 is bolted in the region of the flange extension 30. Between the housing 22 and the starter generator 31, a free annular space can be formed which surrounds the driveshaft 16 of the driving belt pulley 12 and which is positioned inside the mounting means. It can be seen that the tensioning device 21 can be mounted in its entirety by its mounting means at the starter generator without having to remove the driving pulley 12. The process can be applied for the removal of the tensioning device with the driving belt pulley being mounted at the starter generator.

Figure 8:
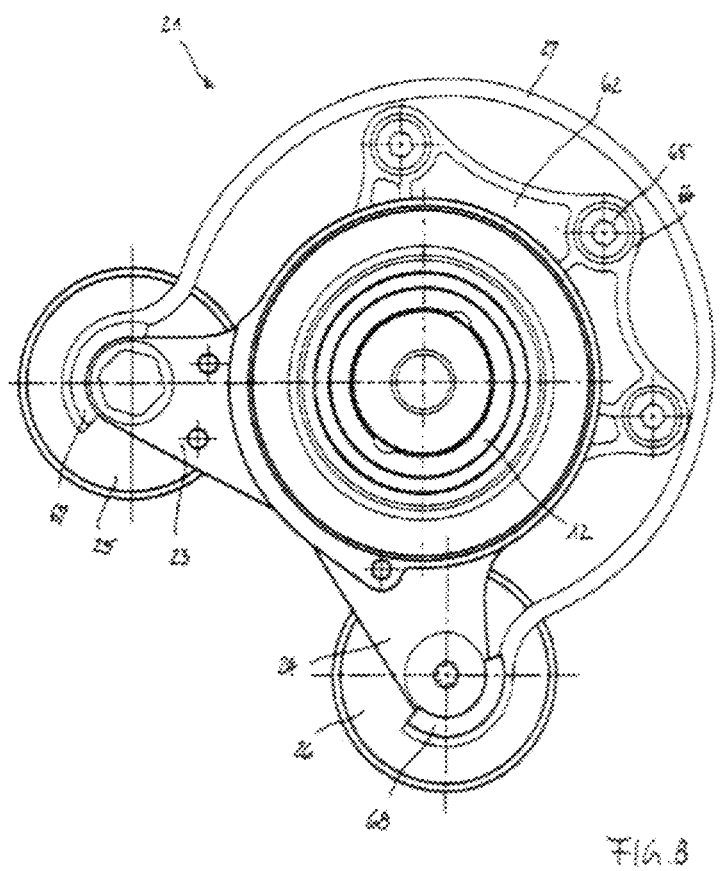
FIG. 8 shows a belt tensioning device in a third embodiment in an axial view.

FIG. 8 shows a further embodiment of a belt drive 21 according to the invention in an axial view of the driving belt pulley 12. The present embodiment largely corresponds to the above-mentioned embodiments according to FIGS. 2 to 7, to the description of which reference is hereby made. In the present embodiment, a holding flange 62 is shown which can be formed onto a central bush-shaped housing 22 which can be bolted to a plurality of housing journals at a driving machine. The flange comprises three flange eyes 64 into which fixing bolts 65 can be threaded. The mounting means which are formed hereby can be provided to extend over a partial circle of more than 30° and less than 270° around the driving belt pulley 12. To achieve good attachment conditions, the partial circle should amount to at least 45° and not more than 180° degree. These ranges can also be applied to the before-mentioned embodiments. The tensioning spring 27 can be provided in the form of a stirrup spring which is clipped on to the tensioning arms 23, 24. Partial bearing bushes 67, 68 can also be provided between the heads of the tensioning arms 23, 24 and the tensioning spring 27.

Figure 9:
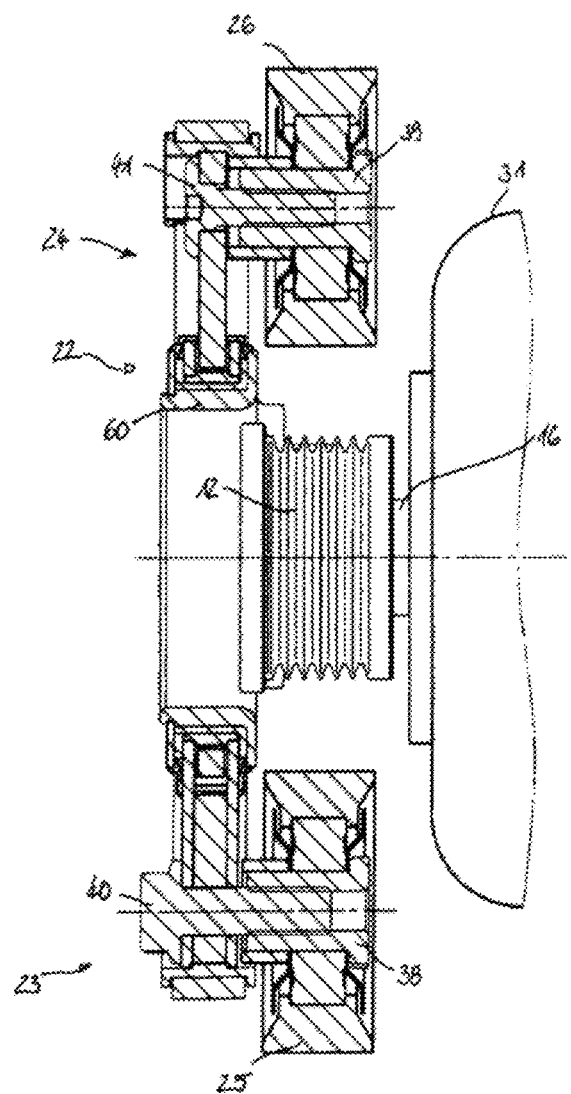
FIG. 9 shows a belt tensioning device according to FIG. 8 in an angled section through the axis of the driving belt pulley and the axes of the tensioning rollers.

In FIG. 9, any details identical to those shown in FIG. 8 have been given the same reference numbers. FIG. 9, like FIG. 4, shows the arrangement of the belt tensioning device 21 relative to the starter generator 31 and to the driving pulley 12. The housing 22 forms a sleeve 60 and changes into the holding flange 62 and can be provided to be contact-free relative to the driving belt pulley and to the stationary bearing means 17 of the driveshaft 16 in the starter generator 31. On the sleeve part 60 of the annular housing 22, the tensioning arms 23, 24 of the two tensioning rollers 25, 26 can be supported. The tensioning arm 23 of the tensioning roller 25, which tensioning arm comprises two cheeks and one sleeve, can be supported directly on the sleeve part 60. The plate-shaped tensioning arm 24 of the tensioning roller 26 can be supported on the tensioning arm 23 of the tensioning roller 25. Bearing journals 38, 39 can be bolted by bolts 40, 41 to the tensioning arms in the form of stationary journals in the respective tensioning arms. The tensioning rollers 25, 26 can be rotatably supported thereon. The tensioning device 21 can be mounted by its mounting means at the starter generator, with the driving belt pulley 12 being in the mounted condition. The same can be applied to the process of removal, with the driving pulley being mounted at the starter generator.

Figure 10:
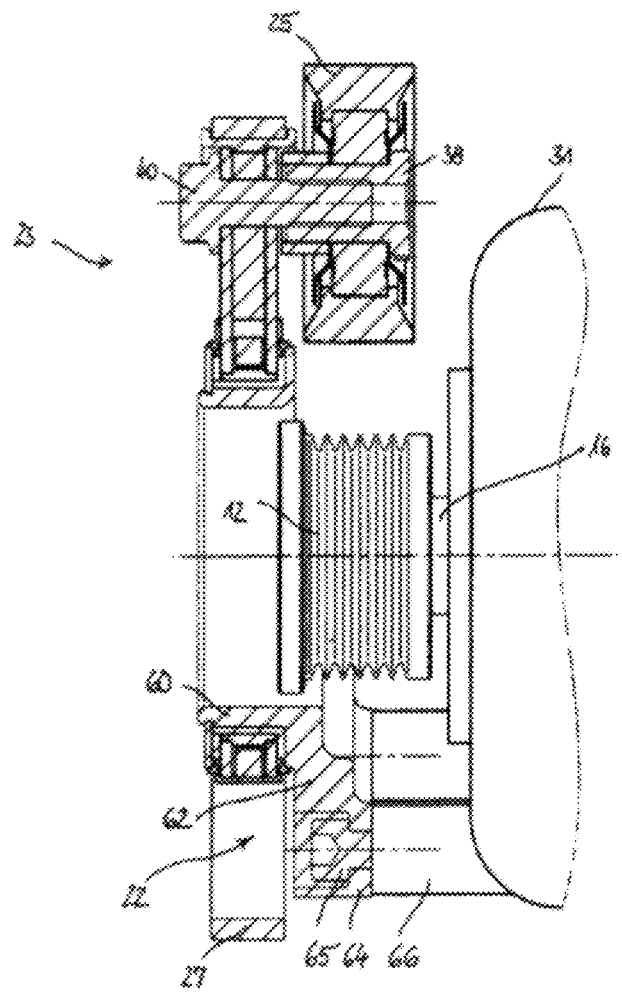
FIG. 10 shows a belt tensioning device according to FIG. 8 in an angled section through the axis of the driving belt pulley, the axis of a tensioning roller and the axis of a mounting bolt.

In FIG. 10, any details corresponding to those in FIGS. 8 and 9 have been given the same reference numbers. As shown, the angled section extends through the axis of the tensioning roller 25 and through one of three fixing journals 66 at the housing of the starter generator 31 to which the housing 22 of the belt tensioning device can be bolted by means of the holding flange 62.

What is claimed is:
1. A belt tensioning device that is adapted for use with a belt drive that includes a driving machine having a driveshaft, a driving belt pulley supported on the driveshaft and having an outer circumferential surface that defines a diameter, a plurality of further belt pulleys, and an infinite belt extending about the outer circumferential surface of the driving belt pulley and the plurality of further belt pulleys, the belt tensioning device comprising:
a housing,
two tensioning arms pivotably supported on the housing about a pivot axis and supporting respective rollers adapted to engage the infinite belt of the belt drive, and
a spring exerting pressure on the two tensioning arms; wherein the pivot axis of the two tensioning arms is adapted to be located within the outer circumferential surface of the driving belt pulley of the belt drive used with the belt tensioning device; and each of the housing and the two tensioning arms has an aperture defining a diameter that is larger than the diameter defined by the outer circumferential surface of the driving belt pulley of the belt drive used with the belt tensioning device.

2. The belt tensioning device according to claim 1, wherein the housing comprises mounting portions configured to be bolted to the driving machine, which mounting portions are positioned outside the diameter defined by the outer circumferential surface of the driving belt pulley of the belt drive used with the belt tensioning device.

3. The belt tensioning device according to claim 2, wherein the mounting portions of the housing extend over a partial circle of 30° to 270° in a circumferential direction around the common axis defined by the two tensioning arms.

4. The belt tensioning device according to claim 2, wherein in a circumferential region of the mounting portions, a gap is formed radially between the housing and the driveshaft of the belt drive used with the belt tensioning device.

5. The belt tensioning device according to claim 1, wherein the housing includes two plates, and wherein the two tensioning arms are held between the two plates.

6. The belt tensioning device according to claim 1, wherein the housing is provided in a shape of a plate with the aperture which is embraced from the inside by the two tensioning arms.

7. The belt tensioning device according to claim 1, wherein the housing is provided in a shape of a sleeve on which the two tensioning arms are supported.

8. The belt tensioning device according to claim 1, wherein a first tensioning arm is supported on the housing and wherein a second tensioning arm is supported on the first tensioning arm.

9. The belt tensioning device according to claim 1, wherein the tensioning rollers are held between two cheeks provided on each of the first and second tensioning arms.

10. The belt tensioning device according to claim 1, wherein the tensioning rollers are held by the tensioning arms in a position whereby the tensioning rollers are overhung on one side.

11. A combined belt drive and belt tensioning device comprising:
a belt drive including a driving machine having a driveshaft, a driving belt pulley supported on the driveshaft and having an outer circumferential surface that defines a diameter, a plurality of further belt pulleys, and an infinite belt extending about the outer circumferential surface of the driving belt pulley and the plurality of further belt pulleys; and
a belt tensioning device including:
a housing,
two tensioning arms supported on the housing for pivoting movement about a pivot axis and supporting respective rollers that engage the infinite belt of the belt tensioning device, and
a spring exerting pressure on the two tensioning arms; wherein
the pivot axis of the two tensioning arms is located within the outer circumferential surface of the driving belt pulley of the belt drive; and
each of the housing and the two tensioning arms has an aperture defining a diameter that is larger than the diameter defined by the outer circumferential surface of the driving belt pulley of the belt drive.

12. The combined belt drive and belt tensioning device according to claim 11, wherein the housing comprises mounting portions configured to be bolted to the driving machine, which mounting portions are positioned outside the diameter defined by the outer circumferential surface of the driving belt pulley of the belt drive.

13. The combined belt drive and belt tensioning device according to claim 12, wherein the mounting portions at the housing extend over a partial circle of 30° to 270° in a circumferential direction around the common axis defined by the two tensioning arms.

14. The combined belt drive and belt tensioning device according to claim 12, wherein in a circumferential region of the mounting portions, a gap is formed radially between the housing and the driveshaft of the belt drive.

15. The combined belt drive and belt tensioning device according to claim 11, wherein the housing includes two plates, and wherein the two tensioning arms are held between the two plates.

16. The combined belt drive and belt tensioning device according to claim 11, wherein the housing is provided in a shape of a plate with the aperture which is embraced from the inside by the two tensioning arms.

17. The combined belt drive and belt tensioning device according to claim 11, wherein the housing is provided in a shape of a sleeve on which the two tensioning arms are supported.

18. The combined belt drive and belt tensioning device according to claim 11, wherein a first tensioning arm is supported on the housing and wherein a second tensioning arm is supported on the first tensioning arm.

19. The combined belt drive and belt tensioning device according to claim 11, wherein the tensioning rollers are held between two cheeks provided on each of the first and second tensioning arms.

20. A method of manufacturing a combined belt drive and belt tensioning device comprising the steps of:
(a) providing a belt drive that includes a driving machine having a driveshaft, a driving belt pulley supported on the driveshaft and having an outer circumferential surface that defines a diameter, a plurality of further belt pulleys, and an infinite belt extending about the outer circumferential surface of the driving belt pulley and the plurality of further belt pulleys;
(b) providing a belt tensioning device including a housing, two tensioning arms pivotably supported on the housing about a pivot axis and supporting respective rollers, and a spring exerting pressure on the two tensioning arms, each of the housing and the two tensioning arms having an aperture defining a diameter that is larger than the diameter defined by the outer circumferential surface of the driving belt pulley of the belt drive; and
(c) assembling the belt drive and the belt tensioning device such that (1) the respective rollers of the belt tensioning device engage the infinite belt of the belt drive, (2) the pivot axis of the two tensioning arms of the belt tensioning device is located within the outer circumference of the driving belt pulley of the belt drive; and (3) the driving belt pulley of the belt drive is located within the apertures of each of the housing and the two tensioning arms of the belt tensioning device.

* * * * *